US006207765B1

(12) United States Patent
Ao et al.

(10) Patent No.: US 6,207,765 B1
(45) Date of Patent: *Mar. 27, 2001

(54) PROCESS FOR BROMINATED STYRENIC POLYMERS

(75) Inventors: Meng-Sheng Ao, Baton Rouge, LA (US); Billie B. Dadgar, Magnolia, AR (US); Charles H. Kolich, Baton Rouge, LA (US); Donald E. Balhoff, Baton Rouge, LA (US); Homer C. Lin, Baton Rouge, LA (US); David R. Brackenridge, Baton Rouge, LA (US); Thorsten W. Brockman, Gastonia, NC (US)

(73) Assignee: Albemarle Corporation, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/291,428

(22) Filed: Apr. 13, 1999

Related U.S. Application Data

(63) Continuation of application No. 09/041,632, filed on Mar. 13, 1998, now Pat. No. 5,916,978, which is a continuation of application No. 08/846,156, filed on Apr. 25, 1997, now Pat. No. 5,767,203, which is a continuation of application No. 08/721,389, filed on Sep. 26, 1996, now abandoned.

(51) Int. Cl.$^7$ ................................................ C08F 8/22
(52) U.S. Cl. .................. 525/356; 525/333.4; 525/357
(58) Field of Search ................................. 525/356, 357

(56) References Cited

U.S. PATENT DOCUMENTS

| | | | |
|---|---|---|---|
| 1,890,772 | 12/1932 | Dykstra | 260/93.5 |
| 2,199,026 | 4/1940 | Levine et al. | 260/74 |
| 2,823,201 | 2/1958 | Wheaton | 260/93.5 |
| 3,009,906 | 11/1961 | Eichhorn et al. | 260/93.5 |
| 3,039,977 | 6/1962 | Ingram | 260/2.5 |
| 3,050,476 | 8/1962 | Tress et al. | 260/2.5 |
| 3,132,045 | 5/1964 | Hill | 117/138 |
| 3,474,067 | 10/1969 | Praetzel et al. | 260/41 |
| 3,506,741 | 4/1970 | Trepka et al. | 260/889 |
| 3,534,012 | 10/1970 | Dennis | 260/91.5 |
| 3,932,542 | 1/1976 | Gerns | 260/650 R |
| 3,959,398 | 5/1976 | Jalics | 260/650 R |
| 3,975,354 | 8/1976 | Buxbaum et al. | 260/40 R |
| 4,028,486 | 6/1977 | Jalics | 526/293 |
| 4,074,032 | 2/1978 | Naarmann et al. | 526/44 |
| 4,107,231 | 8/1978 | Wurmb et al. | 260/873 |
| 4,137,212 | 1/1979 | Theysohn et al. | 260/37 N |
| 4,143,221 | 3/1979 | Naarmann et al. | 526/44 |
| 4,151,223 | 4/1979 | Neuberg et al. | 260/873 |
| 4,178,327 | 12/1979 | Hall et al. | 525/169 |
| 4,200,703 | 4/1980 | Diebel et al. | 525/357 |
| 4,352,909 | 10/1982 | Barda et al. | 525/157 |
| 4,360,455 | 11/1982 | Lindenschmidt et al. | 252/609 |
| 4,389,517 | 6/1983 | Priddy et al. | 526/64 |
| 4,501,859 | 2/1985 | Newman et al. | 525/356 |
| 4,513,116 | 4/1985 | Kowalski et al. | 525/53 |
| 4,548,995 | 10/1985 | Kowalski et al. | 525/354 |
| 4,554,326 | 11/1985 | Kowalski et al. | 525/354 |
| 4,636,554 | 1/1987 | Tada et al. | 525/359.3 |
| 4,650,832 | 3/1987 | Kowalski et al. | 525/354 |
| 4,748,286 | 5/1988 | Daren et al. | 570/200 |
| 4,832,873 | 5/1989 | Favstritsky et al. | 252/601 |
| 4,835,222 | 5/1989 | Sypniewski | 525/359.5 |
| 4,879,353 | 11/1989 | Sanders et al. | 525/357 |
| 4,975,496 | 12/1990 | Tigner et al. | 525/357 |
| 5,112,896 | 5/1992 | Dever et al. | 524/412 |
| 5,112,897 | 5/1992 | Dever et al. | 524/412 |
| 5,112,898 | 5/1992 | Dever et al. | 524/412 |
| 5,194,482 | 3/1993 | Chundury et al. | 524/412 |
| 5,235,000 | 8/1993 | McKinnie | 525/355 |
| 5,243,109 | 9/1993 | Kornberg et al. | 570/193 |
| 5,304,618 | 4/1994 | Atwell et al. | 526/293 |
| 5,326,837 | 7/1994 | Kissin | 526/150 |
| 5,328,983 | 7/1994 | Favstritsky | 528/490 |
| 5,334,680 | 8/1994 | Mukai | 526/207 |
| 5,369,202 | 11/1994 | Atwell et al. | 526/293 |
| 5,532,322 | 7/1996 | Kadono et al. | 525/357 |
| 5,637,650 | 6/1997 | Gill et al. | 525/356 |
| 5,677,390 | 10/1997 | Dadgar et al. | 525/355 |
| 5,686,538 | 11/1997 | Balhoff et al. | 525/355 |
| 5,723,549 | 3/1998 | Dever et al. | 525/333.4 |
| 5,726,252 | 3/1998 | Gill et al. | 525/333.3 |
| 5,733,823 | 3/1998 | Sugioka et al. | 442/110 |
| 5,767,203 | 6/1998 | Ao et al. | 525/355 |
| 5,852,131 | 12/1998 | Balhoff et al. | 525/355 |
| 5,852,132 | 12/1998 | Dadgar et al. | 525/355 |
| 5,916,978 | 6/1999 | Ao et al. | 525/355 |
| B1 4,200,703 | 7/1987 | Diebel et al. | 525/340 |

FOREIGN PATENT DOCUMENTS

| | | |
|---|---|---|
| 0 020 294 | 12/1980 | (EP) . |
| 0 139 931 | 8/1985 | (EP) . |
| 0201411 | 12/1986 | (EP) . |
| 0 277 429 | 8/1988 | (EP) . |
| 0 394 645 | 10/1990 | (EP) . |
| 0 763 567 | 3/1997 | (EP) . |
| 1589700 | 5/1981 | (GB) . |
| 61-034723 | 8/1986 | (JP) . |
| 63-150349 | 6/1988 | (JP) . |
| 2215807 | 8/1990 | (JP) . |
| 6-322022 | 11/1994 | (JP) . |
| 7-2930 | 1/1995 | (JP) . |
| 8-53511 | 2/1996 | (JP) . |
| 10-130325 | 5/1998 | (JP) . |
| 3020708 B2 | 3/2000 | (JP) . |
| WO9503341 | 2/1995 | (WO) . |

OTHER PUBLICATIONS

McCabe et al., "Unit Operations of Chemical Engineering," McGraw–Hill Book Company, Third Edition, pp. 619–627—not dated.

Derwent Abstract of JP 8053511—1968.

(List continued on next page.)

*Primary Examiner*—Bernard Lipman
(74) *Attorney, Agent, or Firm*—E. E. Spielman, Jr.

(57) ABSTRACT

This invention relates to the bromination of styrenic polymers by contacting same with a brominating agent in the presence of a bromination catalyst and, as a reaction solvent, bromochloro-methane.

57 Claims, 1 Drawing Sheet

OTHER PUBLICATIONS

Patent Abstracts of Japan (European Patent Office)—Abstract of JP 051 70809, publication date of Jul. 1993 to Tosoh Corporation.

Brochure from Ferro Corporation, Production Information, Pyro–Chek 68PB & Pyro–Chek 60PB, Brominated Polystyrene Flame Retardant Additives, 4 pages, Dec. 1992.

JP 8176414 (Jul. 9, 1996)—Abstract No. 223551, XP002128364, Chemical Abstracts, Columbus, Ohio, vol. 125, No. 18, Oct. 28, 1996.

JP 8283550 (Oct. 29, 1996)—Abstract Class A13, AN 1997–017575, XP002128367, Database WPI Section Ch, Week 199702, Derwent Publications Ltd., London, GB Jan. 1972.

Wenger, Richard M., "Glass Reinforced Flame Retardant Nylon–Improved Performance For Connector Applications," dated approximately 1984, 19 pages not dated.

Brochure from Ferro Corporation, Fire Retardant Chemical Association, Fall 1992 Conference, "Brominated Polystyrene Flame Retardant Additives," pp. 141–150—Oct. 1992.

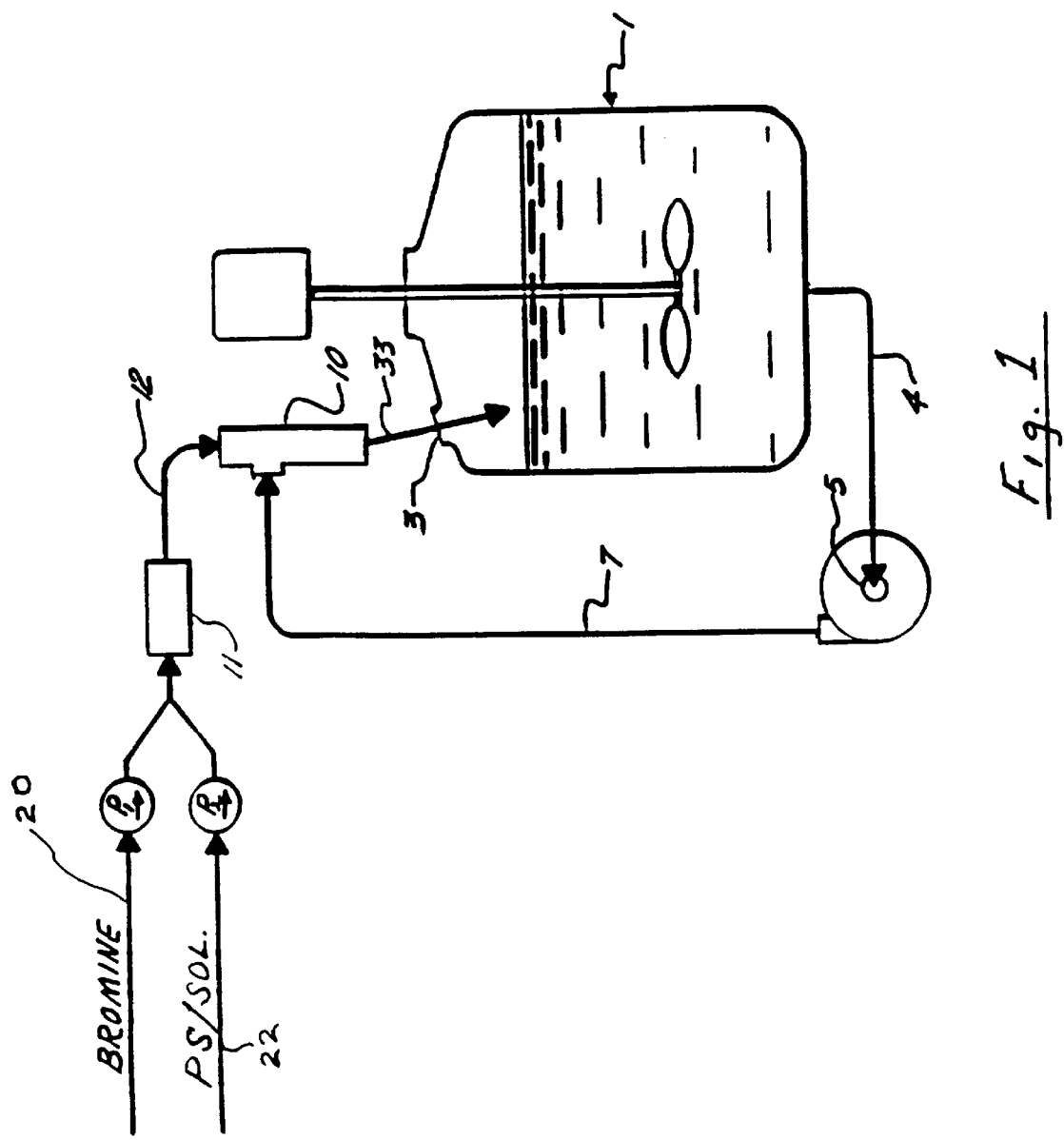

PROCESS FOR BROMINATED STYRENIC POLYMERS

CROSS-REFERENCE TO RELATED APPLICATIONS

This application is a continuation of U.S. Ser. No. 09/041,632 filed Mar. 13, 1998, now U.S. Pat. No. 5,916,978, and is incorporated herein by reference in its entirety, which application is a continuation of U.S. Ser. No. 08/846,156 filed Apr. 25, 1997, now U.S. Pat. No. 5,767,203 issued Jun. 16, 1998, which application is a continuation of U.S. Ser. No. 08/721,389 filed Sep. 26, 1996, now abandoned.

BACKGROUND OF THE INVENTION

This invention relates to the discovery of a highly beneficial solvent for use in the bromination of a styrenic polymer.

Brominated styrenic polymers, e.g., brominated polystyrene, are well recognized flame retardants for use in engineering thermoplastics, e.g., nylon, polyethylene terephthalate, polybutylene terephthalate, etc. These flame retardants are prepared by reacting a brominating agent, e.g., bromine or bromine chloride, with a polystyrene in the presence of a Lewis acid catalyst. Since the styrenic polymer is usually very viscous or a solid, it has been deemed necessary to provide it to the reaction as a solute in a lower viscosity solution. The art generally describes the solvent as being a halogenated hydrocarbon, and, more specifically, a chlorinated hydrocarbon. Methylene chloride and dichloroethane are universally considered to be the solvents of choice. Despite their apparent attractiveness, these two solvents are not without disadvantage.

Methylene chloride is favored as it is relatively inert in the process. However, it is disadvantaged because it has a low boiling point and is challenged as being potentially depletive of the global ozone layer.

In distinction, dichloroethane has an acceptable boiling point and, in use, is more environmentally desirable than methylene chloride. It is not, however, a panacea as it reacts in the process to a significant extent and its use is not associated with an exceptionally low color brominated polystyrene product.

It is, therefore, an object of this invention to provide a solvent for use in the bromination of styrenic polymers which is environmentally beneficial, has a boiling point in the range of 80–95° C., is relatively inert in the bromination process, and is associated with a near-white brominated styrenic polymer product.

THE INVENTION

This invention relates to a process for brominating styrenic polymers, which process comprises: brominating styrenic polymer in the presence of Lewis acid catalyst and solvent quantities of bromochloromethane.

The bromination of the styrenic polymer is preferably effected by either (1) adding a brominating agent to a reactor containing styrenic polymer, bromochloromethane and a Lewis acid catalyst; (2) adding, to a Lewis acid catalyst, (i) a styrenic polymer stream which is comprised of a solution of styrenic polymer and bromochloromethane and (ii) a brominating agent stream, the streams being added separately but substantially concurrently; or (3) adding a mixture which includes a brominating agent, styrenic polymer and bromochloromethane to a Lewis acid catalyst. Besides these preferred modes of addition, it is contemplated that any addition mode which effects reactive contact between the brominating agent, catalyst and styrenic polymer will be benefitted by the use of bromochloromethane as the process solvent. The first-described addition mode is conventional and is illustrated in U.S. Pat. No. 4,200,703 and U.S. Pat. No. 4,352,909. Both of these patents are incorporated herein by reference for all of their teachings except for that teaching which refers to the identity of the process solvent. (Thus, in the '703 patent, column 3, lines 3–16, the Examples and the claims are excluded, while in the '909 patent, the paragraph bridging columns 7 and 8, the Examples and the claims are also excluded.) The second-described addition mode is illustrated by U.S. Pat. No. 4,975,496 which is also incorporated herein by reference for all of its teachings except for that teaching which refers to the process solvent.

For addition mode (2), it is a feature that there be a dispersion of at least a portion of the brominating agent substantially throughout the catalyst before there is any substantial complexing (cross-linking) of the styrenic polymer. When the brominating catalyst is $AlCl_3$, there is generally a need to pre-add a portion of the bromine to the catalyst prior to introduction of the styrenic polymer. In such cases, at least 5 mole percent of the brominating agent is pre-added. See incorporated U.S. Pat. No. 4,975,496 for further details concerning the pre-addition of the brominating agent.

For mode (3), it is preferred that the mixture be formed via mixing of the components in a device which is outside or inside of the reactor and feeding the resultant mix to the reactor. In addition, a stream from the reactor can also be fed to the mixing device to contribute to the total resultant mix being sent back to the reactor. Also, for addition mode (3), it is preferred that the bromochloromethane, styrenic polymer and the brominating agent be substantially free of brominating catalyst at least prior to their being mixed. The phrase, "substantially free of a bromination catalyst", is to be taken to mean less than a catalytically effective amount of catalyst. With such low amounts, little or no catalyzed bromination or cross-linking should occur. Generally, such amounts will be less than 500 ppm (weight basis) of styrenic polymer present.

The amount of bromochloromethane solvent used is that amount which can dissolve the styrenic polymer and any of the brominated styrenic polymer species produced. Also, it is preferred that the amount of bromochloromethane used will result in an easily-stirred reaction mass. Generally, the total solvent used will be that amount which is needed to dissolve the styrenic polymer to yield an easy-flowing solution and that amount which may be initially present in the reactor and associated with reaction components other than styrenic polymer. In most cases, the amount of bromochloromethane used to form the styrenic polymer solution will provide a solution which contains 3 to 30 wt % styrenic polymer, based upon the total weight of the solution.

The presence or absence of water in the bromochloromethane will be in accordance with the water requirements of the particular process chosen. For example, anhydrous processes, such as that described in U.S. Pat. No. 4,352,909, will be sensitive to the solvent water content. Other processes, such as that disclosed in U.S. Pat. No. 4,200,702, require a certain level of water and, thus, are not as sensitive to the solvent water content. Still other processes, which are substantially independent of water content, can be somewhat indifferent about the solvent water content. Unless the solvent is being used as a major contributor of water to the process, most practitioners will choose bromochloromethane having less than about 100 ppm (weight basis) water.

PREFERRED EMBODIMENTS

Styrenic polymers which are brominated in accordance with the present invention are homopolymers and copolymers of vinyl aromatic monomers, that is, monomers having an unsaturated moiety and an aromatic moiety. The preferred vinyl aromatic monomers have the formula:

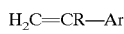

$$H_2C=CR-Ar$$

wherein R is hydrogen or an alkyl group having from 1 to 4 carbon atoms and Ar is an aromatic radical (including various alkyl and halo-ring-substituted aromatic units) of from 6 to 10 carbon atoms. Examples of such vinyl aromatic monomers are styrene, alpha-methylstyrene, ortho-methylstyrene, meta-methylstyrene, para-methylstyrene, para-ethylstyrene, isopropenyltoluene, isopropenylnaphthalene, vinyl toluene, vinyl naphthalene, vinyl biphenyl, vinyl anthracene, the dimethylstyrenes, t-butylstyrene, the several chlorostyrenes (such as the mono- and dichloro-variants), the several bromostyrenes (such as the mono-, dibromo- and tribromo-variants). Polystyrene is the currently preferred styrenic polymer and, when the styrenic polymer being brominated is a copolymer of two or more vinyl aromatic monomers, it is preferred that styrene be one of the monomers and that styrene comprise at least 50 weight percent of the copolymerizable vinyl aromatic monomers.

The styrenic polymers, which are brominated in accordance with the present invention, are readily prepared by bulk or mass, solution, suspension or emulsion polymerization techniques comparable to those employed in the polymerization of styrene. Polymerization can be effected in the presence of free radical, cationic or anionic initiators, such as di-t-butyl peroxide, azo-bis(isobutyronitrile), di-benzoyl peroxide, t-butyl perbenzoate, dicumyl peroxide, potassium persulfate, aluminum trichloride, boron trifluoride, etherate complexes, titanium tetrachloride, n-butyllithium, t-butyllithium, cumylpotassium, 1,3-trilithiocyclohexane, and the like. The polymerization of styrene, alone or in the presence of one or more monomers copolymerizable with styrene, is well known and it is considered unnecessary to further discuss the polymerization process. The styrenic polymers having a molecular weight of at least 1,000, preferably at least 50,000 and most preferably 150,000 to 500,000, are brominated in accordance with the present invention. Although styrenic polymers outside these molecular weight ranges can be brominated in accordance with the present invention, there is typically no economic advantage in so doing.

The catalyst used in the processes of this invention can be any bromination catalyst, provided that the catalyst does not act to frustrate the efficient and safe production of a high quality brominated polystyrenic product. The favored catalysts are the Lewis acid catalysts which are typified by $AlCl_3$, $FeCl_3$, $AlBr_3$, $FeBr_3$, $SbCl_5$, $ZrCl_4$, and the like. Fe, Al and $Sb_2O_3$ may be used to form Lewis acid catalysts by simply adding them to the reaction system. Mixtures of catalyst can also be used. Once the catalyst has been added to the reaction system, it may undergo some reaction without significant loss of catalytic activity, e.g., $AlCl_3$ may convert to some extent to AlBr. The more preferred catalysts are the aluminum and iron-based catalysts. Of these, the most preferred are the aluminum and iron halides, especially the bromides and chlorides. $AlCl_3$ and $FeCl_3$ are most highly preferred, with $AlCl_3$ being the catalyst of choice.

The catalyst is used in an amount which is sufficient to obtain the catalytic effect sought. These catalytic amounts will depend on the activity of the catalyst, but will generally fall within the range of from about 0.2 to about 20 weight percent and preferably within the range of from about 0.2 to about 15 weight percent, based on the weight of the styrenic polymer being brominated. The most active catalysts will be used in the lower amounts while the less active catalysts will be used in the higher amounts. For the preferred aluminum and iron-based catalysts, it is preferred that they be used in amounts within the range of from about 0.5 to about 5 weight percent. $AlCl_3$ and $FeCl_3$ are useful in amounts within the range of from about 0.5 to about 10 weight percent. When $AlCl_3$ is the catalyst, amounts within the range of from about 0.5 to about 3 weight percent are preferred.

The brominating agents useful in the processes of this invention can be any of those which can brominate aromatic carbons in the polymer's vinyl aromatic units (hereinafter also referred to as styrenic monomer units). The art recognizes $Br_2$ and BrCl as good brominating agents, with the former being most preferred. Bromine can be obtained commercially in the diatomic form or can be generated by the oxidation of HBr. $Br_2$ can be supplied either as a liquid or a gas. The amount of brominating agent used in the process should provide an overall mole ratio of total brominating agent to total styrenic polymer fed, which will provide from 1 to 3 bromine substitutions per styrenic monomer unit in the polymer. Generally, it is desired that the brominated styrenic polymer products of this invention contain at least 30 wt % bromine, based upon the total weight of the brominated polymer. It is preferred that the brominated polymer contain above about 50 wt % bromine and most preferably above about 60 wt % bromine. For any particular styrenic polymer, the amount of brominating agent used in the process will be determined by the bromine content desired considering the highest bromine content which is obtainable with the process parameters chosen. The higher bromine contents will require the most brominating agent. It is pointed out that as perbromination is approached, it becomes more difficult to substitute the last bromines. Adding ever larger amounts of a brominating agent does not always attenuate this difficulty. However, it is helpful, in attempting to maximize the bromine content, to provide a small stoichiometric excess of brominating agent. Stoichiometric excesses up to about 10% are preferred. The stoichiometry is easily determined as it requires one mole of $Br_2$ or BrCl per substitution sought. In practice, the practitioner will determine the bromine content sought on a weight basis and then will calculate, on an idealized basis, the number of moles of brominating agent needed to obtain the same. For example, if the styrenic polymer is polystyrene and the bromine content sought is 68 wt %, at least 2.7 moles of bromine or BrCl per styrenic monomer unit will be required, not including any desired stoichiometric excess. For brominated polystyrene, a bromine content of from about 40 to about 70+wt % bromine is desirable. This range can be theoretically obtained with a mole ratio of bromine to styrenic monomer unit of from about 0.9:1 to about 3.0:1 Preferred for brominated polystyrene is a bromine content of from about 60 to about 70+wt %, which can be obtained with a theoretical mole ratio of from about 1.9:1 to about 3.0:1 for bromine or BrCl. The processes of this invention can, with facility, provide up to 70 wt %, say 67–68 wt %, bromine. For addition modes (2) and (3), the amount of brominating agent used in the process is that amount of brominating agent in the feed mixture and any brominating agent pre-added to the catalyst. As pointed out herein, for addition mode (3), it is not necessary to pre-add a brominating agent to the catalyst and, thus, all of the process brominating agent requirements can be supplied via the feed of the mixture. If, however, the practitioner chooses to pre-add a brominating agent to the reactor, it can be done and that amount of brominating agent is part of the overall amount of brominating agent used.

While the foregoing describes the overall quantitative relationship between the brominating agent and styrenic polymer, the quantitative relationship between these two reactants in the feed mixture for addition mode (3) has not been fully discussed. Generally, the mixture which is to be fed will contain from about 1 to about 8 moles of brominating agent per mole of styrenic monomer units at any time during the feed period. During the feed, the quantitative relationship can be constant or can vary within the above-mentioned range. (It is within the scope of this invention to allow for some excursions outside of the range so long as such does not do significant harm to the process efficiency or to product quality.) A preferred range is from about 2.5 to about 5 moles of brominating agent per mole of styrenic monomer units in the feed mixture. As can be appreciated, the use of an amount of brominating agent in the feed mixture which gives a mole ratio of brominating agent to styrenic monomer units which is less than or greater than the selected overall mole ratio of brominating agent to styrenic monomer units, will result in exhaustion of either the brominating agent or the styrenic polymer as a mixture constituent before exhaustion of the other constituent. For example, if the practitioner chooses to produce brominated polystyrene with a 70 wt % bromine content, an overall molar ratio of bromine to styrenic monomer units of 3.0:1, and any excess if desired, would be suitable. If the practitioner chooses to form a feed mixture in which the molar ratio of bromine to styrenic monomer units is 1:1, it can be seen that the amount of polystyrene to be fed will be completed before obtaining the needed overall amount of bromine. In this case, the practitioner first uses the 1:1 mixture and then continues on with just a bromine feed after the polystyrene feed has been exhausted. If, on the other hand, the molar ratio in the feed mixture is chosen to be 5:1, then the bromine will first become exhausted and the feed will have to be finished with the polystyrene alone. Generally, it is preferred to have the overall molar ratio and the feed mixture ratio at least somewhat similar. In all cases though, the initial feed should preferably contain at least a molar ratio of bromine to styrenic monomer units of 1:1.

It is preferred that the bromine used in the processes of this invention be essentially anhydrous, i.e., contain less than 100 ppm (weight basis) water and contain no more than 10 ppm organic impurities, e.g., oil, grease, carbonyl containing hydrocarbons, iron, and the like. Available, commercial grade bromine may have such purity. If, however, such is not available, the organic impurities and water content of the bromine can be conveniently reduced by mixing together a 3 to 1 volume ratio of bromine and concentrated (94–98 percent) sulfuric acid. A two-phase mix is formed which is stirred for 10–16 hours. After stirring and settling, the sulfuric acid phase, along with the impurities and water, is separated from the bromine phase. To further enhance the purity of the bromine, the recovered bromine phase can be subjected to distillation.

By forming a solution of bromochloromethane and styrenic polymer, the polymer becomes easy to handle and mix with bromine. The solutions of this invention, e.g., the reactor contents for addition mode (1) and the polystyrene streams for addition modes (2) and (3), will generally contain from about 5 to about 50 wt % polymer. More highly preferred are those which contain from about 5 to about 30 wt % polymer. When considering the total bromochloromethane in the process, which total would include that amount of bromochloromethane used to render the catalyst stirrable in addition modes (2) and (3), typically there will be 5 to 40 wt % styrenic polymer. Preferably, this range will have an upper limit of from 20 to 35 wt % styrenic polymer, the wt % being based on the total weight of bromochloromethane and styrenic polymer used in the process.

It is preferred to have the bromination catalyst associated with an amount of bromochloromethane so that the catalyst can be in a solution, slurry, dispersion or suspension as it is being contacted with the brominating agent and styrenic polymer. Such will enhance reaction mass mixing and mass transfer qualities. This association is best when considered to be a suspension. It is suitable to use from about 95 to about 99.9 wt % bromochloromethane and preferably from about 99 to about 99.8 wt %, based on the total weight of bromochloromethane and catalyst.

The feeds used in the processes of this invention should occur expeditiously, with consideration being given to the ability of the process equipment to handle the heat load from the exothermic process, the evolving HBr, and other process concerns. In short, the feeds can occur over the shortest time period that will be allowed by the equipment without excursion outside of critical process parameters. Generally, it is anticipated that the feed period will be from 0.5 to 3 hours for a commercial-size plant. Shorter feed periods are expected for smaller scale processes.

The processes of this invention occur at a temperature within the range of from about −20 to about 60° C. and preferably within the range of from about 0 to about 10° C. The pressure can be atmospheric, subatmospheric or superatmospheric.

To carry out a process of this invention, a bromination catalyst, say AlCl$_3$, is suspended in essentially anhydrous bromochloromethane, to give an easily stirrable suspension. The suspension is prepared in a glass-lined, stirred reactor and brought to a temperature within the range of from about −5 to about 10° C. The mix is kept under an inert, dry atmosphere in the reactor. A solution of a styrenic polymer and bromochloromethane is prepared and intimately mixed with a bromine stream to yield a homogenous mixture. The cool mixture is fed into the stirred bromination catalyst suspension in the reactor. The intimate mixing of the styrenic polymer solution and brominating agent can be accomplished in a number of ways. For example, the solution and a brominating agent can be fed to a mixing device, e.g., a mixing nozzle, at the lower end of the dip tube in the reactor which extends to a point below the suspension level. The mixing device is designed to obtain the intimate mixing of the solution and brominating agent. Also, the mixing device acts to impart mixing energy, at the point of feed, to the intimate mixture and catalyst suspension. Another technique for obtaining intimate mixing of the styrenic polymer solution and brominating agent, is to use an exterior reactor loop having an in-line mixer, say an impingement mixer. Generally, the use of an exterior reactor loop includes first charging the reactor with a bromination catalyst slurry, suspension, etc., and then withdrawing from the reactor a stream which is then fed to a mixer external of the reactor. A mixture formed from at least bromine and styrenic polymer is also fed to the mixer to yield a second mixture which is formed from the two feeds to the mixer. The second mixture is subsequently fed back to the reactor. The stream withdrawn from the reactor will initially comprise the catalyst. After the second mixture is fed to the reactor and the process runs, the withdrawn stream will begin to comprise brominated polystyrene along with catalyst. As the process continues, the degree of bromination of the polystyrene will increase.

DESCRIPTION OF DRAWING

Exemplifying the use of an exterior reactor loop, reference is made to FIG. 1 wherein there is shown a reactor, generally designated by the numeral 1. Reactor 1 is a stirred reactor and initially contains a suspension comprising catalyst and bromochloromethane. Reactor discharge conduit 4 provides a stream from reactor 1 which is fed to pump 5. Pump pressurizes the stream so that it is fed with force via conduit 7 to impingement mixer 10. Bromine is fed via conduit 20 to pump $P_1$ while, at the same time, a solution of polystyrene and bromochloromethane is fed via conduit 22 to pump $P_2$. Pumps $P_1$ and $P_2$ feed in-line mixer 11 to obtain an intimate mixture of bromine, polystyrene, and bromochloromethane solvent. This intimate mixture is fed to impingement mixer 10, wherein it is intimately mixed with the stream from reactor 1. The discharge from impingement mixer 10 is fed via conduit 33 to reactor 1 through feed port 3. The removal of contents from reactor 1 and their feed to impingement mixer 10 continues to occur until at least substantially all of the bromine and polystyrene/bromochloromethane solution have been fed.

As can be appreciated, the contents of reactor 1 change in composition during the bromine and polystyrene/bromochloromethane solution feeds. Initially, the contents of reactor 1 comprise catalyst and bromochloromethane. As the process runs, the reactor contents comprise and begin to become more rich in brominated polystyrene, some of which is underbrominated and some of which is of the degree of bromination sought. During a cook period, the final bromination occurs. Removal of the reactor contents can continue to occur during the cook period to aid in mixing.

As pointed out earlier, the bromination of styrenic polymers is a substitution reaction. The main by-product from this reaction is HBr. The HBr formed in the process is usually found in the head space above the reactor contents. It is preferred that the HBr be removed and passed to a water scrubber or stored as dry HBr. A dry, inert gas, say nitrogen, can be used as a pad over the reactor contents to minimize the presence of water therein.

The reactor is kept at a low temperature, e.g., from about 0 to about 10° C., during the feed of styrenic polymer and/or brominating agent feed, as the case may be, and preferably from about 4 to about 8° C.

After the feed is accomplished, the reactor is preferably maintained for a cook period of from about 0.5 to about 6 hours and preferably from about 1 to about 3 hours. The cook temperature is within the range of from about 0 to about 10° C. and preferably within the range of from about 2 to about 5° C. The cook period serves to continue the bromination until the sought degree of bromination is obtained. It may be for a long period if the reaction parameters provide for mild bromination conditions during the brominating agent and styrenic polymer feeds or it may be for a short period if the parameters chosen provide for more severe bromination conditions. The cook period can occur in the reactor.

After the cook period, the reaction mass can be treated with water, sodium sulfite, sodium gluconate and sodium hydroxide to deactivate the catalyst, kill any remaining brominating agent and to adjust the reaction mass pH. After these treatments, the reaction mass is settled to obtain a two-phase reaction mass containing an organic phase, which contains, as a solute, the brominated styrenic polymer product, and an aqueous phase. The aqueous phase is decanted and the remaining organic phase is stripped of its bromochloromethane component. It is most convenient to accomplish this strip by pouring the organic phase into boiling water. As the solvent is stripped, the brominated styrenic polymer product forms a precipitate. The precipitate can be recovered by any liquid-solid separation technique, e.g., filtration, centrifugation, etc. The recovered precipitate is then dried.

It is preferred that the bromochloromethane solvent be dry, that is it contains less than about 200 ppm (weight basis) water and more preferably less than about 150 or 100 ppm water.

The following Examples illustrate features of processes of this invention. The Delta E values, along with the L, a and b values from which it is derived, were obtained by transmission measurements made with a HunterLab Color Quest Spectrocolorimeter. The transmission cell provided a 20 mm path length. The software was set to report the color in units of "Delta E-lab". The standardization/calibration was based upon chlorobenzene and obtained by use of the instrument's black and white standard tiles. The brominated polystyrene sample to be tested was prepared by measuring 5 grams of the sample into a 50 ml centrifuge tube. Then, 45 grams of chlorobenzene was placed in the tube. The tube is shaken for 1 hour on a wrist-action shaker. If, after the shaking period has lapsed, the solution is not clear it is centrifuged for 10 minutes at 4,000 rpm. If the solution is still not clear, it is then centrifuged another 10 minutes. If the solution is still not clear, then it cannot be analyzed. Assuming a clear solution, the solution is poured to fill the 20 mm cell for placement in the colorimeter. The calibrated instrument is set to report color as "Delta E-lab".

EXAMPLE I

Batch Bromination of Polystyrene
Bromochloromethane Solvent

Bromine (683.5 g, 4.277 mole) was added over 75 minutes to a cooled (5° C.) solution of 165.0 g (1.585 mole) of polystyrene (PS) dissolved in 1,188 ml (2,364 g) of anhydrous bromochloromethane (BCM) in the presence of 3.3 g (2.9 wt % based on PS) of aluminum chloride. Evolved HBr was scrubbed by a caustic solution during the reaction. A cook period of 2 hours at 5° C. with nitrogen purge was effected. The reactor contents were diluted with 2,444 ml (4,863 g) BCM, washed with 2,000 ml water, aqueous sodium sulfite (30 g in 2,000 ml water) and then with 2,000 ml water. The aqueous and organic layers were separated. The organic layer was added batchwise into 7,000 ml of 90° C. water with agitation. BCM was removed with a Dean-Stark trap from the return distillate. The mixture was cooled and the solid product was filtered, washed (with water) and dried at 150° C. to obtain 477 g (95% yield) of brominated PS. The results of analysis are shown in the Table.

EXAMPLE II

Batch Bromination of Polystyrene Ethylene
Dichloride Solvent

The bromination of PS was repeated as in Example I except as indicated in the Table. The amount of ethylene dichloride, EDC, used was in the same volume proportion as the BCM used in each step. The analytical results for the product are in the Table.

EXAMPLE III

Pre-mix of Polystyrene and Bromine for the Bromination of Polystyrene Bromochloromethane Solvent A Y-shaped mixing apparatus having a cooling jacket was equipped with 2 feed lines, each connected to a pump. One of the feed lines was for delivering bromine and the other was for L delivering a PS and BCM solution. Bromine (93.3 g, 31.3 ml or 0.583 mole), delivered at a rate of 1 ml/min (19.4 mmol/min), and a PS/BCM solution (22.4 g PS, 0.215 mole and 97 ml or 194 g of anhydrous BCM), delivered at 4 ml/min (7.17 mmol/min), were fed simultaneously from their respective feed lines into the cooled (5° C.) Y-mixing apparatus. The resultant intimate mixture from the mixing apparatus was then fed into a cooled (5° C.) suspension of 0.45 g (2 wt % based on PS) of aluminum chloride in 49 ml (98 g) of anhydrous BCM. Evolved HBr was scrubbed by a caustic solution during the reaction. The feeds were complete in 35 minutes and the mixture was cooked for 2 hours at 5° C. After water and sodium sulfite washes, solid BrPS was isolated by precipitating from 500 ml of hot (90° C.) water as described above. A total of 66 g of BrPS (97% yield) was obtained. The results of analysis are shown in the Table.

cooling to 3° C., a 10-ml portion of bromine was added. A solution of PS/BCM (175 g or 1.681 mole of PS dissolved in 791 ml or 1,574 g of anhydrous BCM) was pumped into the suspension at a rate of 15 ml/min (25.47 mmol/min), while bromine (total of 725 g, 230 ml, 4.537 moles, 2.7 equivalents) was added from an addition funnel at a rate of 3 ml/min (58 mmol/min). Evolved HBr was scrubbed by a caustic solution during the reaction. The mixture was held at 5° C. throughout the feed and cook period. After 3.3-hr cook, the mixture was diluted with BCM (1.068 ml or 2.127 g) and then washed with aqueous sodium sulfite and water. The product was precipitated in water and isolated as described in the previous section. A total of 522 g of BrPS (98% yield) was obtained. The results of analysis are shown in the Table.

EXAMPLE VI

Co-feed of Separate Streams of Polystyrene and Bromine for the Bromination of Polystyrene Ethylene Dichloride Solvent The bromination of PS was repeated as in Example V except as is indicated in the Table. The amount of EDC used was in the same volume proportion as the BCM used in each step. The analytical results are in the Table.

TABLE

|  | Ex. I | Ex. II | Ex. III | Ex. IV | Ex. V | Ex. VI |
|---|---|---|---|---|---|---|
| Mode of Addition | Batch | Batch | Premixed | Premixed | Cofeed | Cofeed |
| Solvent/deg C | BCM/5 | EDC/5 | BCM/5 | EDC/5 | BCM/5 | EDC/5 |
| AlCl3 Load (wt % of PS) | 2 | 2.7 | 2 | 2.1 | 2 | 2 |
| Avg Feed Mole Ratio Br/PS | — | — | 2.7 | 2.7 | 2.3 | 2.2 |
| Total Eq. Br2 | 2.7 | 2.8 | 2.7 | 2.7 | 2.7 | 2.7 |
| Feed Times Br2/PS (min/min) | 75/0 | 67/0 | 35/35 | 30/30 | 76/66 | 76/62 |
| Cook Time (min) | 240 | 140 | 120 | 120 | 200 | 200 |
| BrPS Yield (%) | 95 |  | 97 | 97 | 98 | 97 |
| Total Br (wt %) | 66.8 | 66.2 | 68.4 | 67.6 | 68.0 | 67.0 |
| Hydro. Br (ppm) | 2,868 | 7,138 | 2,827 | 3,778 | 1,695 | 2,680 |
| Solution Color (10% PhCl) |  |  |  |  |  |  |
| L | 93.21 | 88.97 | 95.74 | 87.10 | 96.94 | 96.45 |
| a | −2.88 | −3.34 | −1.90 | −1.68 | −1.12 | −2.51 |
| b | 22.24 | 36.65 | 15.99 | 34.80 | 7.89 | 13.80 |
| Delta E | 23.43 | 38.42 | 16.44 | 37.15 | 8.54 | 14.48 |
| GC Analysis of Solvent (Area %) |  |  |  |  |  |  |
| Before Reaction | 99.44 | 99.97 | 99.44 | 99.97 | 99.44 | 99.97 |
| After Reaction | 99.49 | 99.70 | 99.28 | 99.06 | 99.35 | 98.64 |
| New Impurities in Recov. Solvent |  |  |  |  |  |  |
| Ethylene Dibromide | — | 0.18 | — | 0.90 | — | 1.28 |
| Dibromobenzene | 0.02 | 0.10 | — | — | — | — |

EXAMPLE IV
Pre-mix of Polystyrene and Bromine for the Bromination of Polystyrene Ethylene Dichloride Solvent The bromination of PS was repeated as in Example III except as indicated in the Table. The amount of EDC used was the same volume proportion as the BCM used in each step. The analytical results are in the Table.

EXAMPLE V
Co-feed of Separate Streams of Polystyrene and Bromine for the Bromination of Polystyrene Bromochloromethane Solvent Aluminum chloride (3.54 g, 2 wt % based on PS) was suspended in 379 ml (754 g) of anhydrous BCM. After As can be seen from the Table, the use of bromochloromethane provides a brominated product having superior color and Delta E values with little or no degradation of the process solvent.

EXAMPLE VII

A 0.910 g (6.82 mmol) portion of aluminum chloride was suspended (stirred at 250 rpm) in 190 g of dry (13 ppm water) bromochloromethane (BCM) in 1-L jacketed flask cooled to 0° C. by circulating glycol bath. A 419.86 g portion of a 10.00 wt % solution of polystyrene (403.1/n mmol) in dry BCM was pumped at a constant rate of 8.46 g/min (8.13 mmol/min) to a jacketed, glycol-cooled mixing tee mounted on the reaction flask. At the same time, bromine was pumped at a constant rate of 6.09 g/min (38.1 mmol/min) to the same mixing tee where it-combined with the polystyrene solution (feed mol ratio $Br_2$/PS is 4.69) before dropping into the stirred catalyst suspension in the reaction flask. The bromine feed was stopped after 30.0 min (1143.5 mmol) and the polystyrene solution feed was stopped after 49.6 min (overall mol ratio of $Br_2$/PS is 2.84). A rinse of 160 g of dry BCM was used for the polystyrene solution feed system to assure complete transfer of the polymer to the reaction flask. The reaction temperature was maintained at 0–5° C. throughout the addition and subsequent 2 hr cook period. The catalyst was deactivated by addition of 16.4 g of 10 wt % aqueous solution of sodium gluconate, and pH was adjusted to 14 by addition of 60.7 g of 10 wt % aqueous NaOH. The reaction mixture was washed with 10 wt % aqueous sodium sulfite followed by a water wash. The product was recovered from the organic phase by addition to vigorously stirred hot (90° C.) water. The solvent distilled from the hot water leaving a slurry of the brominated polystyrene product in water. After filtering, the powdery solid was rinsed with water and dried to constant weight in a vacuum oven (150° C./2 torr/5 hr). The dry solid weighed 127.08 g (95% yield). The product contained 68.7 wt % total Br and 3600 ppm hydrolyzable Br. The HunterLab solution color (10 wt % in chlorobenzene) values were L=94.58, a=−2.79, b=17.29, Delta E=18.34.

The brominated styrenic polymers of this invention are suitable for use as flame retardants in thermoplastics, especially engineering thermoplastics, e.g., polybutylene terephthalate, polyethylene terephthalate, nylon and the like. These brominated polymers are used in flame retarding quantities, say from about 5 to about 20 wt % brominated polymer per hundred weight of thermoplastic. Conventional blending techniques can be used as taught in the prior art. In addition, conventional additives, such as UV stabilizers, impact modifiers, flame retardant synergists, dyes, pigments, fillers, plasticizers, flow aids, antioxidants, free radical initiators, and the like may be used as the need requires.

What is claimed:

1. A process for producing brominated polystrene, which process comprises feeding a mixture comprised of a brominating agent and polystyrene to a reaction vessel to which was previously added bromochloromethane solvent and a Lewis acid catalyst, the mole ratio of brominating agent to polystyrene in the feed mixture being from about 1:1 to about 8:1.

2. The process of claim 1 wherein the mole ratio is from about 2.5:1 to about 5:1.

3. The process of claim 1 wherein the mole ratio is substantially constant during the mixture feed.

4. The process of claim 1 wherein the mole ratio varies during the mixture feed.

5. The process of claim 1 wherein the mole ratio of the brominating agent to the polystyrene in the mixture is subsusbstantially equal to the molar ratio of the total brominating agent fed to the total polystrene feed.

6. The process of claim 1 wherein the mole ratio is from about 2.5: to about 5:1 and is substantially constant during the mixture feed.

7. The process of claim 1 wherein the mole ratio is from about 2:5 to about 5:1 and varies during the mixture feed.

8. The process of claim 5 wherein the mole ratio is from about 2.5: to about 5:1 and is substantially constant during the mixture feed.

9. The process of claim 5 wherein the mole ratio is from about 2:5 to about 5:1 and varies during the mixture feed.

10. A process which comprises contacting styrenic polymer with a brominating agent in the presence of a bromination catalyst and a solvent quantity of bromochloromethane to form brominated styrenic polymer.

11. The process of claim 10 wherein the brominating agent is bromine, bromine chloride, or a mixture thereof.

12. The process of claim 10 wherein the styrenic polymer is polystyrene.

13. The process of claim 10 wherein the catalyst is selected from aluminum, iron, antimony, and zirconium chlorides.

14. The process of claim 10 wherein the catalyst is selected from aluminum and iron bromides.

15. The process of claim 10 wherein the catalyst is a catalyst formed by adding Fe, Al, or $Sb_2O_3$ to the reaction system.

16. The process of any of claims 10–15 wherein the brominated polymer formed contains above about 50 wt % bromine.

17. The process of any of claims 10–15 wherein the process is conducted at a temperature within the range of from about −20° C. to about 60° C.

18. A process which comprises adding a brominating agent to a reactor containing styrenic polymer, bromochloromethane, and a bromination catalyst to form brominated styrenic polymer.

19. The process of claim 18 wherein the brominating agent is bromine, bromine chloride, or a mixture thereof.

20. The process of claim 18 wherein the styrenic polymer is polystyrene.

21. The process of claim 18 wherein the catalyst is selected from aluminum, iron, antimony, and zirconium chlorides.

22. The process of claim 18 wherein the catalyst is selected from aluminum and iron bromides.

23. The process of claim 18 wherein the catalyst is a catalyst formed by adding Fe, Al, or $Sb_2O_3$ to the reaction system.

24. The process of claim 18 wherein the amount of the catalyst falls within the range of from about 0.2 to about 20 wt % based on the weight of the styrenic polymer being brominated.

25. The process of any of claims 18–24 wherein the brominated polymer formed contains above about 50 wt % bromine.

26. The process of any of claims 18–24 wherein the process is conducted at a temperature within the range of from about −20° C. to about 60° C.

27. A process which comprises brominating styrenic polymer in the presence of a bromination catalyst and a solvent quantity of bromochloromethane such that brominated styrenic polymer containing at least 30 wt % bromine, based upon the total weight of the brominated polymer, is formed.

28. The process of claim 27 wherein the bromination is conducted using bromine, bromine chloride, or a mixture thereof.

29. The process of claim 27 wherein the styrenic polymer is polystyrene.

30. The process of claim 27 wherein the catalyst is selected from aluminum, iron, antimony, and zirconium chlorides.

31. The process of claim 27 wherein the catalyst is selected from aluminum and iron bromides.

32. The process of claim 27 wherein the catalyst is a catalyst formed by adding Fe, Al, or $Sb_2O_3$ to the reaction system.

33. The process of any of claims 27–32 wherein the brominated styrenic polymer formed contains above about 50 wt % bromine.

34. The process of any of claims 27–32 wherein the process is conducted at a temperature within the range of from about −20° C. to about 60° C.

35. A process which comprises brominating styrenic polymer having a molecular weight of at least 50,000 with a brominating agent in the presence of a bromination catalyst and an amount of bromochloromethane solvent that can dissolve the styrenic polymer and the brominated styrenic polymer species produced.

36. A process for preparing a brominated styrenic polymer, which process comprises brominating a styrenic polymer having a molecular weight in the range of 150,000 to 500,000 with a brominating agent in the presence of a bromination catalyst and in a solvent quantity of bromochloromethane.

37. The process of claim 35 or 36 wherein the amount of brominating agent used provides an overall ratio of total brominating agent to total styrenic polymer which will provide from 1 to 3 bromine substitutions per styrenic monomer unit in the polymer.

38. The process of claim 35 or 36 wherein the styrenic polymer is polystyrene and wherein the amount of brominating agent forms brominated polystyrene with a bromine content of from about 60 to about 70 wt %.

39. The process of claim 38 wherein said bromine content is 67–68 wt %.

40. The process of claim 38 wherein the process is conducted at a temperature within the range of from about −20° C. to about 60° C.

41. The process of claim 38 wherein the brominating agent is bromine, bromine chloride, or a mixture thereof.

42. The process of claim 38 wherein the catalyst is selected from aluminum, iron, antimony, and zirconium chlorides.

43. The process of claim 38 wherein the catalyst is selected from aluminum and iron bromides.

44. The process of claim 38 wherein the catalyst is a catalyst formed by adding Fe, Al, or $Sb_2O_3$ to the reaction system.

45. A process of preparing a brominated styrenic polymer, which process comprises adding to a reactor containing a bromination catalyst (i) a styrenic polymer stream comprised of a solution of styrenic polymer and bromochloromethane, and (ii) a brominating agent stream, said streams being added separately but substantially concurrently.

46. The process of claim 45 wherein there is a dispersion of at least a portion of the brominating agent substantially throughout the catalyst before there is any substantial complexing of the styrenic polymer.

47. A process of preparing a brominated styrenic polymer, which process comprises adding a mixture which includes a brominating agent, styrenic polymer, and bromochloromethane to a reactor containing a bromination catalyst.

48. The process of claim 47 wherein said mixture is formed by mixing the components in a device which is outside or inside of said reactor, and feeding the resultant mixture to said reactor.

49. The process of any of claims 45–48 wherein the brominating agent is bromine, bromine chloride, or a mixture thereof.

50. The process of any of claims 45–48 wherein the styrenic polymer is polystyrene.

51. The process of any of claims 45–48 wherein the catalyst is selected from aluminum, iron, antimony, and zirconium chlorides.

52. The process of any of claims 45–48 wherein the catalyst is selected from aluminum and iron bromides.

53. The process of any of claims 45–48 wherein the catalyst is a catalyst formed by adding Fe, Al, or $Sb_2O_3$ to the reactor.

54. The process of any of claims 45–48 wherein the brominated polymer formed contains above about 50 wt % bromine.

55. A process which comprises feeding a feed comprised of polystyrene and bromochloromethane and a separate feed comprised of a brominating agent to a reactor containing bromochloromethane solvent and a bromination catalyst.

56. A process which comprises feeding a mixture comprised of brominating agent and polystyrene to a reactor containing bromochloromethane solvent and a bromination catalyst.

57. A process of claim 55 or 56 wherein the catalyst is a catalyst formed by adding Fe, Al, or $Sb_2O_3$ to the reactor.

\* \* \* \* \*